United States Patent [19]

Story

[11] 3,815,570

[45] June 11, 1974

[54] SAW APPARATUS PARTICULARLY USEFUL IN CUTTING ROCK

[76] Inventor: Samuel M. Story, 11352 Stanford Ave., Garden Grove, Calif. 92640

[22] Filed: Oct. 12, 1971

[21] Appl. No.: 188,387

Related U.S. Application Data

[63] Continuation of Ser. No. 804,735, Feb. 13, 1969, abandoned.

[52] U.S. Cl. .................................. 125/14, 125/35
[51] Int. Cl. .................................. B28d 1/04
[58] Field of Search ............ 125/13, 14, 35; 143/47, 143/40; 30/390; 83/486, 488, 489, 469–471.3, 743–745

[56] References Cited
UNITED STATES PATENTS

| | | | |
|---|---|---|---|
| 518,655 | 4/1894 | Stow | 143/40 |
| 1,491,287 | 4/1924 | Canning | 125/13 R |
| 1,852,370 | 4/1932 | Pullian | 125/13 |
| 2,431,469 | 11/1947 | Eyles | 125/13 |
| 2,450,523 | 10/1948 | Parker | 125/14 |
| 2,486,765 | 11/1949 | Snyder | 125/35 X |
| 2,525,712 | 10/1950 | Neighbour | 143/47 UX |
| 2,557,251 | 6/1951 | Baker | 125/13 R |
| 2,610,389 | 9/1952 | Bungay | 143/47 H |
| 2,795,091 | 6/1957 | Umlderstock | 51/232 X |
| 2,804,734 | 9/1957 | Mentley | 51/232 |
| 2,851,068 | 9/1958 | Goodlet | 125/13 |
| 2,909,169 | 10/1959 | Vonada | 125/13 R |
| 3,332,412 | 7/1967 | Clement | 125/14 |

FOREIGN PATENTS OR APPLICATIONS

| | | | |
|---|---|---|---|
| 34,151 | 1/1886 | Germany | 125/13 |
| 533,596 | 9/1955 | Italy | 125/13 |
| 496,132 | 1/1953 | Italy | 125/13 |

OTHER PUBLICATIONS

3,491,807 1-1970 Underwood filed 8-1967.

*Primary Examiner*—Harold D. Whitehead

[57] ABSTRACT

An improved saw having cutter means including one or more saw blades mounted on a carrier which is freely movable on a track along a predetermined path, and including means for tilting that track relative to horizontal in order to selectively control the amount of gravitational force urging the saw blade, or blades, toward the lower end of the track, and said cutter means further including provision for using a single saw blade in either of two positions in order to substantially double the thickness of stone which the saw blade may cut; and said saw further including a vise which may be adjusted relative to the path of movement of the saw blade, which vise includes one or more chains which may be used, at a variety of positions, to grip a rock to be cut against the bed of the vise, and further including a cam and wedge system which enables the locking chains to be rapidly attached.

17 Claims, 15 Drawing Figures

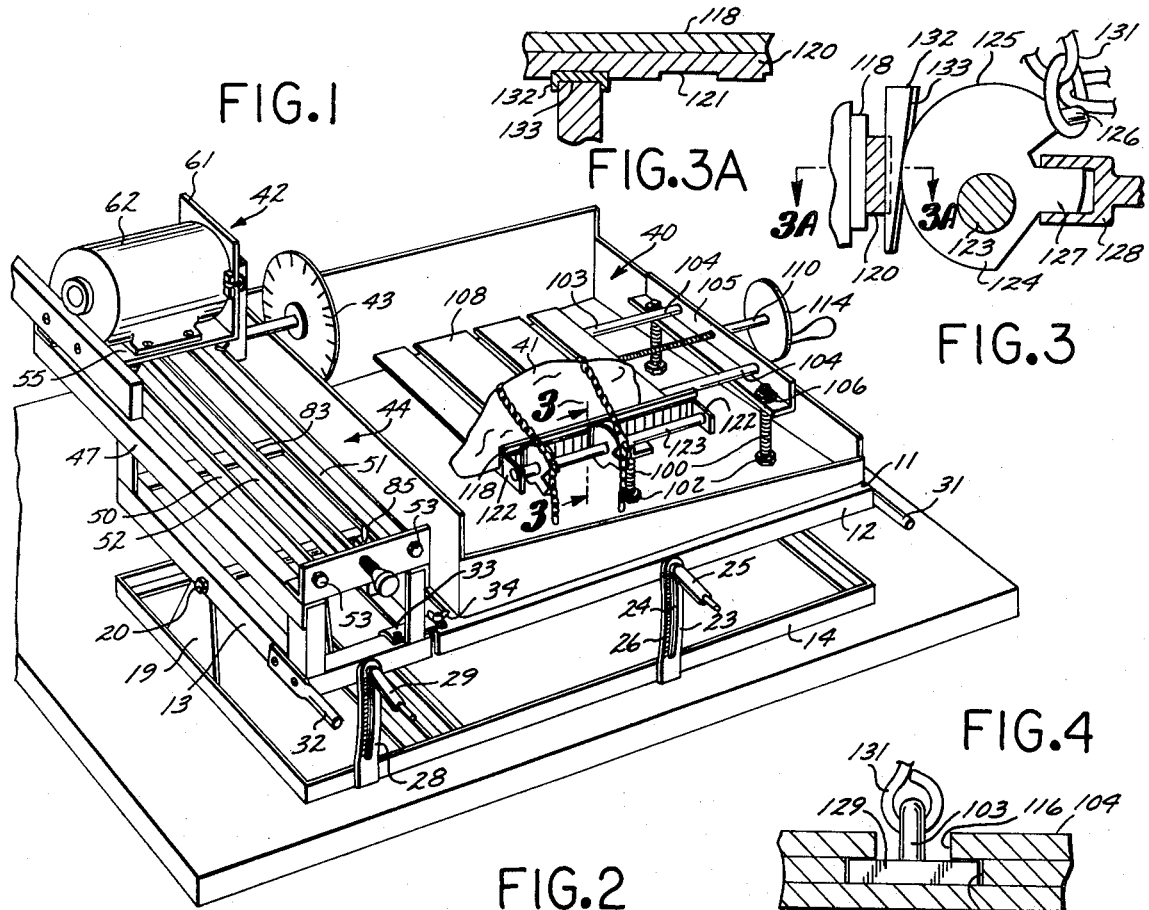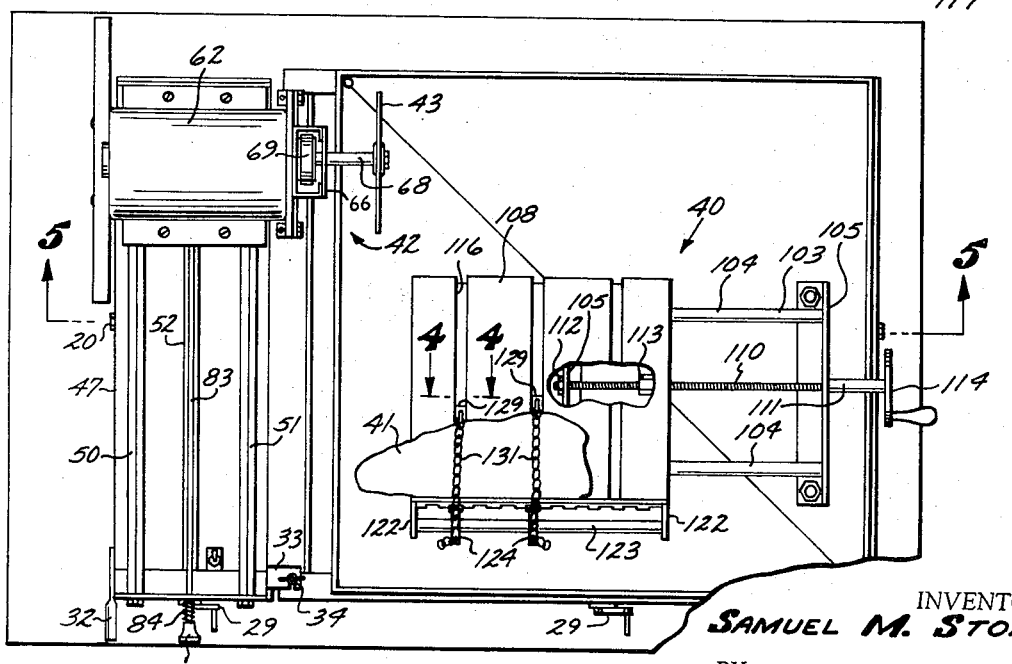

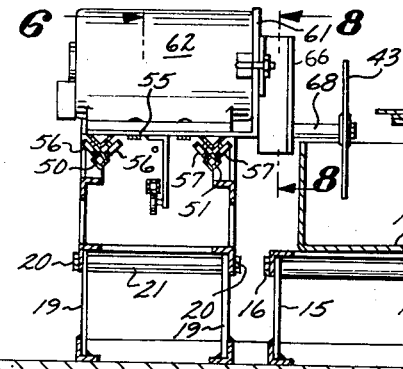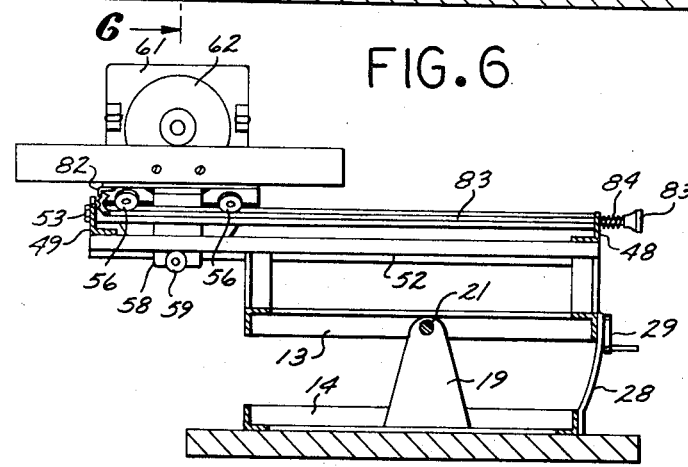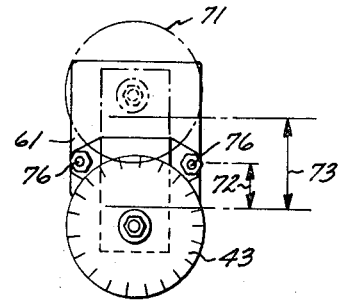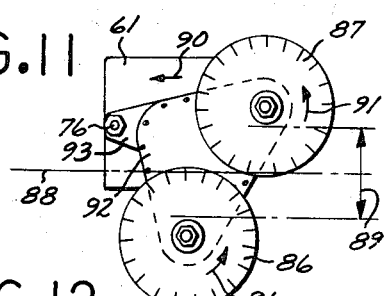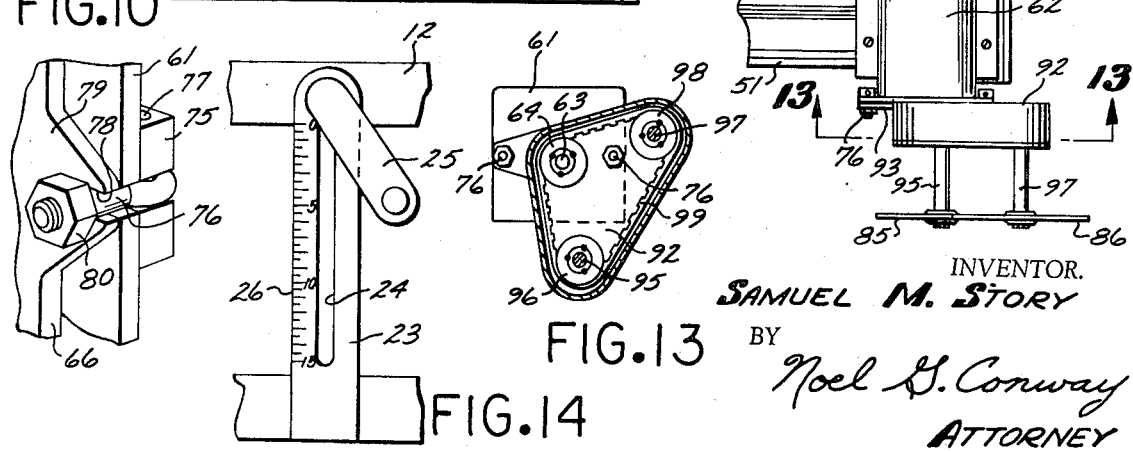

SAW APPARATUS PARTICULARLY USEFUL IN CUTTING ROCK

This is a continuation of my now abandoned application Ser. No. 804,735, filed Feb. 13, 1969 for SAW APPARATUS PARTICULARLY USEFUL IN CUTTING ROCK.

This invention relates to saws, and more specifically to saw apparatus which is particularly useful in sawing stones and other objects which have irregular shapes, and varying density.

A principal use for embodiments of the present invention is in saw apparatus which will cut rock into slabs which slabs are later cut into smaller pieces and shaped for items such as, for example, jewelry for ornamental purposes.

One aspect of the present invention is that the saw apparatus nearly doubles the effective cutting depth of the saw blade by providing for easy adjustment of the saw blade relative to the apparatus in a particular manner. This reduces the cost of the saw blade. Saw blades have diamonds imbedded in them and are quite expensive. Additionally, the cost of such saw blades goes up faster than the diameter of the blade.

This manner of doubling the effective cutting depth of the saw blade has the additional advantage that the smaller blades are substantially thinner than the thicker blades. A blade which has twice the diameter of another blade will be from 35 to 60 percent thicker than the smaller blade. This wastes a considerable amount of material since most of the slabs are cut approximately three-sixteenths of an inch thick. As some rock materials are very valuable, such waste is expensive.

In some embodiments of the invention, the saw has two smaller blades which are disposed so as to cut the rock from the top and the bottom at the same time. The saw blades are disposed in the same plane so as to provide a smooth surface after the cutting operation.

Another aspect of the present invention is that it provides a low cost means which can effect a selected constant force tending to advance the saw blade into the work as the saw blade passes through the rock. This is advantageous in that the saw automatically tends to accommodate variations in the thickness and density in a particular rock being cut. In thin sections, or in softer sections of the rock, the saw blade is advanced more rapidly through the work than in the situations where the blade is cutting through a thick section or a harder, more dense section. In some prior art devices, the blade is advanced into the work by means of a lead screw. Such method has the disadvantage that the apparatus cannot accommodate irregularities in shape and density as in the present apparatus. Further, the saw has the particular advantage that the amount of force can be quickly changed to the desired amount at any time during the operation. For example, if the operator sees that the saw is cutting too hard, he can quickly reduce the tilt of the track on which the cutter means rides to immediately reduce the advancement force.

Another aspect of the present invention is the unique manner in which the saw is able to securely anchor the rock to be cut. As the rocks come in such a wide variety of sizes and shapes, it is extremely difficult to provide a simple structure which can obtain a good purchase on any of such rocks. In embodiments of the present invention, there is provided a vise which enables chains to be used at practically any selected position in order to quickly anchor the rock to the bed of the vise. Such chains grip the rock more firmly and securely than prior art apparatus of much greater complexity.

With the foregoing in mind, it is a major object of this invention to provide a saw particularly useful in sawing objects of irregular shapes and irregular densities.

Another object of this invention is to provide an improved saw having easily adjustable means for applying the saw blade to the work at a constant force.

A further object of this invention is to provide an improved saw which has the capability of nearly doubling the effective cutting radius of a saw blade.

Still another object of this invention is to provide a saw which can cut thicker rock with less waste.

A still further object of this invention is to provide a saw for more rapidly cutting thick rock.

Still another object of this invention is to provide an improved saw having means for advancing the saw blade into the work, which saw may be inexpensively manufactured and maintained.

A still further object of this invention is to provide a saw apparatus having an improved means for holding irregular shapes to be sawed.

Still another object of this invention is to provide an improved vise for holding objects of irregular shapes.

A still further object of this invention is to provide a vise for holding objects of irregular shapes, which vise may quickly anchor an object to the vise, and may quickly be released therefrom.

It is still another object of this invention to provide a low cost vise for holding irregular objects, which vise can accommodate a wide variety of sizes and shapes of objects to be held.

It is still a further object of this invention to provide an improved saw apparatus which may be manufactured at a low cost, and is inexpensive to operate and maintain.

Other and further objects of this invention will become apparent in the detailed description below in conjunction with the attached drawings wherein:

FIG. 1 is a perspective view of a preferred embodiment of the present invention;

FIG. 2 is a plan view of the saw apparatus disclosed in FIG. 1;

FIG. 3 is an enlarged fragmentary view of a wedge and cam assembly used in the vise of the saw taken along line 3—3 in FIG. 1;

FIG. 3A is an enlarged fragmentary cross sectional view of the wedge and cam assembly taken along line 3A—3A in FIG. 3;

FIG. 4 is an enlarged fragmentary cross sectional view of the bed of the saw's vise taken along line 4—4 in FIG. 2;

FIG. 5 is a frontal cross sectional view of the saw taken along line 5—5 in FIG. 2;

FIG. 6 is a partial cross sectional side view of the cutter area of the saw with the coolant pan removed for clarity, which view is taken along line 6—6 in FIG. 5;

FIG. 7 is a cross sectional view of the saw as seen in FIG. 6, but with the track means on which the cutter means rides at a greater tilt;

FIG. 8 is a fragmentary view taken along line 8—8 in FIG. 5 disclosing details of the manner in which the driven shaft of the saw blade is connected to the driving shaft of the cutter means;

FIG. 9 is a fragmentary view disclosing the manner in which the saw blade can be placed in one of two positions in order to effectively nearly double the cutting radius of the blade;

FIG. 10 is an enlarged fragmentary view disclosing details of the manner in which the driven shaft housing which carries the saw blade may be detachably secured to the carriage on which the cutter means travels;

FIG. 11 is a fragmentary view disclosing an alternate saw attachment wherein two saw blades are in operation at the same time;

FIG. 12 is a fragmentary plan of view of the saw arrangement in FIG. 11;

FIG. 13 is a cross sectional view of the saw arrangement in FIG. 11 taken along line 13—13 in FIG. 12; and, FIG. 14 is an enlarged fragmentary view disclosing a preferred mechanism for selectively holding the saw frame in a particular desired orientation relative to gravity.

Referring now to FIGS. 1, 2, 5, 6, and 7 in particular, the preferred embodiment of the present invention will be described in further detail. As can be seen, the apparatus includes a frame structure 11 comprising a right hand section 12 and a left hand section 13 which are tiltably positioned above a base 14. As best shown in FIG. 5, a pair of upstanding supports 15 on the base 14, support the right hand frame section 12 by means of axle bolts 16 which are threaded into either end of the axle 17. The axle 17 has been partially cut away in order to disclose certain other structure of the apparatus to be later described.

At the left side of the base 14, there are a pair of upstanding supports 19. By means of axle bolts 20, which are threaded into axle 21, the left hand section 13 of the frame may be tilted relative to the base 14, and therefore gravity, about the horizontal axis extending through the axles 21 and 17.

For purposes which have been mentioned above, and will be described in further detail below, it is desired that the frame 11, including its right and left hand sections 12 and 13, be selectively tilted relative to gravity. To this end, there is provided an upstanding brake post 23 secured to the base 14 (see FIGS. 1 and 14 in particular). The brake post 23 has a vertical slot therein, through which a lock screw 25 extends to be threaded into the front edge member of the right hand frame section 12. The lock screw 25 is such that it may be rotated clockwise in order to tighten an enlarged head against the brake post 23 to press the brake post against said right hand frame section 12. This will lock the frame section 12 in any desired position. For a purpose which will be described in further detail below, a series of marks 26 are provided on the brake post 23 in order to assist the user in selecting the desired number of degrees that the frame section 12 will be turned relative to horizontal.

The left hand section 13 is similarly selectively locked in any desired position by means of an upstanding brake post 28 and lock screw 29. As the brake post 23 and lock screw 25 are conventional, they will not be described in further detail.

In order to facilitate the tilting of the frame 11, there is provided a projecting handle 31 on the right edge of right hand section 12 and a projecting handle 32 on the left hand edge of the left hand section 13 of the frame.

It is preferred, that, at desired times, the user be capable of moving the left hand section 13 and the right hand section 13 of the frame 11 together. To this end, there is provided a connecting plate 33, swingably secured to the left hand frame section 13. This plate 33 has a slot at its right end (as seen in FIG. 1) which is received around the shank of a bolt 34 which is threaded into the right hand frame section 11. By tightening the bolt 34, the right hand and left hand frame sections, 12 and 13, respectively, will then be secured together for movement together.

Having described the frame structure 11, and the manner in which it is supported for tilting orientation, the balance of the saw apparatus will be described in further detail. A cover which is normally in position surrounding the cutting area has been removed to facilitate viewing of the apparatus. As can be seen, there is provided on the right hand frame section 12 a vise means, indicated generally by the arrow 40, which is used to hold the item to be cut, e.g., a rock 41, in a position to be cut. On the left hand section 13, there is provided a cutter means, indicated generally by the arrow 42. The cutter means 42 includes a motor driven saw blade 43, and it includes travel, or track, means, indicated generally by the arrow 44, in order to enable the saw blade to travel through the rock 41 during the cutting operation.

The track means 44 includes a track support structure 47 which has a front cross plate 48 and a rear cross plate 49 between which the rails of the track are extended. More particularly, it can be seen that left rail 50 and right rail 51 extend between the front and rear cross plates 48 and 49 respectively, and are secured by means such as bolts 53. Also, a retainer rail 52 is secured to the underside of the front and rear cross plates 48 and 49 by means such as welding. Above the rails 50 and 51, there is provided a carriage 55 which has support rollers 56 and 57 supporting the carriage above the rail 50 and the rail 51 respectively.

It should be noted that the rail 50 has a square cross section and is oriented with one corner edge on the upper side. Additionally, the rollers 56 are oriented at 45° to vertical in order to ride on the two generally upwardly facing sides presented by the rail 50 by virtue of its described relationship. The same is true as to the relationship of the right hand rail 51 and the rollers 57. This orientation has the advantage that the rails 50 and 51 not only give vertical support to the carriage 55, they accurately hold the carriage against any tendency to move to the right or to the left. Further, should the two sides of the rails 50 and 51 become worn, the rails need merely be rotated 180° (as seen in FIG. 5) and two new surfaces will be presented on said rails.

In order to resist any forces tending to raise the carriage 55 off of the rails 50 and 51, the carriage is provided with a depending support 58 having a retainer roller 59 thereon. The roller 59 is positioned to ride on the underside of the retainer rail 52, and thereby accomplish its intended function.

The carriage 55 has a mounting flange 61 on the right end thereof (as seen in FIG. 5), and has an electric motor 62 secured thereto. Through a hole (not shown) in the mounting flange 61 is extended driving shaft 63 of the motor 62, on which driving shaft there is located a driving pulley 64.

By means which will be described, a driven pulley support 66 is selectively secured to the mounting flange 61. As best shown in FIG. 8, the pulley support 66 has a driven pulley 67 therein received on driven shaft 68 which is rotatably secured to the driven pulley support. Then, by means of a lug belt 69, the rotation of the driving pulley 64 is positively transmitted to the driven shaft 68. By keying the saw blade 43 to the shaft 68, the rotary forces of the motor 62 rotate the said saw blade.

Referring now to FIG. 9, a particular aspect of the present invention will be described in further detail. In a manner to be described below, the driven pulley support 66 can be turned between its position shown in FIG. 8 (and FIG. 9 in full lines) and a second, upper position where the driven pulley 67 is above the driving pulley 64 rather than below it. In FIG. 9, center line 71 is included to disclose the outline of the saw blade 43 when the driven pulley support 66 is in that upper position. As can be seen, the driven shaft 68 is offset from the driving shaft 63 an amount such that there will be a slight overlapping of the area covered by the saw 43 when the driven pulley support 66 is in lower position and the area covered by said saw blade when said driven pulley support is in the upper position.

When the driven pulley support 66 is in the lower position, the saw blade 43 has an effective cutting radius illustrated by dimension line 72. The effective cutting raidus of the saw blade 43 is the distance that it may cut into a rock without having the hub of the saw blade engage the rock. With the present invention, the effective thickness of rhe rock which may be cut is demonstrated by the dimension line 73. As can be seen, the dimension line 73 is alsmost twice as long as the dimension line 72.

In order to accomplish this advantageous result easily, certain further structure is provided. Referring now to FIG. 10 in particular, it can be seen that there is provided a boss 75 on the mounting flange 61. A bolt 76 is swingably mounted by means of pin 77 to the boss 75. Further, the driven pulley support 66 has a notch 78 in tab 79. Thereby, the bolt 76 may be swung into the notch 78. Then, through the use of a nut 80, the tab 79 may be secured to the mounting flange 61. On the opposite side of the mounting flange 61 (the left side as seen in FIGS. 8 and 9) there is provided substantially this same structure.

It can be seen that the center line of the driving shaft 63 is in line with a line joining centers of the notches 78. Therefore, the driven pulley support 66 may be placed in either of the desired positions specified above. In practice, the nuts 80 need merely be loosened slightly. Then, the bolts 76 may be swung out of the way. Then, the driven pulley support 66 is swung 180° clockwise or countercloskwise (as seen in FIG. 8) to the upper position. Then, the bolts 76 are swung back into the slot 78, and the nuts 80 are tightened. This may be accomplished very rapidly.

No matter which position the support 66 is in, the saw blade 43 will be in the same plane relative to the carriage 55 and the mounting flange 61. Therefore, a smooth cut will be made.

With the arrangement described, the saw blade 43 may be moved through the rock 41 as desired by moving the carriage 55 along the rails 50 and 51. In the preferred embodiment of the invention disclosed, the cut of the rock 41 is always made commencing from the rear and moving forward. Therefore, since the track means 44 is selectively tilted, it is desired that some means be provided to hold the carriage 55 at the rear, or starting, position. To this end, there is provided a latch member 81 pivotally secured to the rear cross plate 49 for movement between a first position (shown in FIG. 6) where it engages a projection 82 on the carriage 55, and a second position where said last mentioned projection is released. In order to cause the latch member 81 to operate properly, there is provided a tie rod 83 connected to the latch member, which tie rod extends through the front cross plate 48 and has a knob 83a thereon. A compression spring 84 urges against the cross plate 48 and the knob 83a to keep the latch member 81 in the locked position.

On the front cross plate 48 there is provided a toggle switch 85. This switch 85 is connected such that it will turn on the electric motor 62 and the handle of the switch is in the rear position. And correspondingly, the electric motor 62 is turned off when the handle of the switch 85 is moved to the forward position. This switch 85 is located at such position that the carriage 55 will engage the handle of the switch and move the handle to said forward position as the carriage reaches its forward end of its travel along the track means 44. Therefore, the saw automatically turns itself off after the cutting operation is complete.

The manner in which the cutter means 42 is used will now be described. Firstly, the motor 62 and the carriage 55 are moved to the rearward position shown in FIGS. 1 and 6. At that position the latch 81 will function to retain the carriage 55 in the rear position. At such time, the handle of the switch 85 is retained in its forward position wherein the motor 62 will not be energized.

Then, if it is desired to move the left and right hand sections 13 and 12 together, the plate 33 is swung into position and the bolt 34 is tightened—if it has not been done previously. Thereby, the right and left hand sections 12 and 13 of the frame 11 will be moved together. Then, if the same has not previously been done, the frame 11 is turned to the position shown in FIG. 6 wherein the track means 44 relative to horizontal (such as shown in FIG. 7, by way of example). When the frame 11, and therefore, the track means 44 are in the tilted position, the force of gravity will tend to force the carriage 55 to traverse down the track means with the motor 62 and the saw blade 43.

As is obvious, the greater the tilt of the track means 44 to horizontal, the greater will be the force tending to urge the saw blade 43 through the rock 41. Accordingly, the instructions with the subject saw provide that the harder rocks are preferably to be cut with the track means 44 at one incline, while the softer rocks are preferably cut with the said track means at a different incline.

After the track means 44 has been tilted to the desired angle, the operator will tighten one or both of the lock screws 25 and 29 to lock the frame 11 in the desired orientation. Then, the operator will turn on the motor by switching the switch 85. At that time, he places his left hand on the motor 62 and presses inward on the knob 83a in order to release the carriage 55 from its starting position. Then, (with his left hand slowing the advance of the motor 62 and the saw blade 43) the operator allows the carriage 55 to advance toward the front of the apparatus until the saw blade engages the rock 41. At this time, the operator will release the motor 62 and allow gravity to continue to force the saw blade 43 through the rock 41. Then, as previously described, the carriage 55 will engage the toggle switch 85 to turn off the saw motor 62 after the sawing operation is completed.

With the apparatus described, it can be seen that the cutter means 42 has a capability of advancing its saw blade 43 across its track means 44 to move the saw blade through the rock 41. Further, the upstanding brake post 28 and the lock screw 29 function in combination with the tilting support of the left hand frame section 13 to control the amount of force which the cutter means 42 applies to the item to be cut. Thus, they form a cutting force means which causes a selected constant force tending to advance the saw blade 43 irrespective of the resistance to advancement by varying conditions in the item being cut.

If the portion of the rock 41 being cut is thicker than the effective cutting radius of the blade 43, the carriage 55 is returned to the starting position shown in FIG. 1 after the just described cutting action. The latch 81 will prevent the carriage 55 from rolling back down the inclined track means 44. Then, the nuts 80 are loosened slightly and the driven pulley support 66 is turned to the upper position previously described. Then, the nuts 80 are tightened, the switch 85 is turned to energize the motor 62, and the knob 83a is pushed in order to allow the carriage 55 to advance again. Here again, the operator's hand will be used to slow the advancement of the saw blade 43 until the saw blade engages the rock 41. Then, the force of gravity will advance the saw blade through the rock.

In cases where it is desired that the right hand frame section 12 and the left hand section 13 are operated independently of each other, the connecting plate 33 is moved out of its operative position shown in FIG. 1. In such cases, the use of the cutter means 42 is substantially the same and will not be described again. In such cases, care is taken in order to assure that the driven shaft 68, carrying the saw blade 43, does not engage the sidewall of the coolant pan.

Sometimes it is desired to cut large amounts of extra thick rock. Although a previously described unit can accomplish this, time can be saved by using an attachment having two saw blades such as shown in FIGS. 11 to 13. Such attachment includes a lower saw blade 86 and an upper saw blade 87 which have a special orientation to the center line 88 of the cutting swath of the two blades. Said cutting swath is indicated by center line 89. The blades 86 and 87 are moved through the rock in the direction indicated by the arrow 90. Therefore, it can be seen that the blade 87 is above and slightly behind the blade 86 in relationship to said path of movement This is to permit an effective overlapping of the two blades.

The direction of turning of the two blades 86 and 87 is of particular importance. It will be noted that each of the blades are turning counterclockwise (as seen in FIG. 7) as indicated by the arrows 91. With this direction of turning, (relative to the direction of movement of the saw blades), the cuttings and sludge from the saw blade 86 are thrown downward and somewhat forward. On the other hand, the sludge and cuttings from the upper saw blade 86 are thrown to the rear and downward out of the way. This is considerably better than a situation where the saw blades 86 and 87 were rotating clockwise, or in opposite directions to each other.

For said saw blades 86 and 87, there is provided a casing 92 having a tab 93 thereon to receive the left hand bolt 76 (as seen in FIG. 13). The back side of the casing 91 also has a hole at the proper position to receive the bolt 76 on the right hand side (as seen in FIG. 13) of the mounting flange 61. Lower driven shaft 97 is mounted on the casing 92 by means of a bearing (not shown) and carries thereon lower driven pulley 96. Upper driven shaft 97 is similarly mounted on the casing 92, and carries upper driven pulley 98. Then, through means of lug belt 99, the rotational forces of driving pulley 64 are transmitted through the driven pulleys 96 and 98 to the driven shafts 95 and 97 respectively. Thereby, teh saw blades 85 and 86 receive their needed rotational motion.

The cutter means 42 is used substantially the same with the two blade cutting attachment shown in FIGS. 11 and 13 as previously described. More particularly, the carriage 55 is held in its rear position by the latch 81. Then, the track means 44 are turned to the desired tilt and the switch 85 is turned to turn on the motor 62. The operator uses his hand to slow the advancement of the carriage 55 until the saw blades 86 and 87 engage the item to be cut, e.g., a rock. Then, gravity applies the selected force to advance the saw blades 86 and 87 through the said item.

Having described the manner in which the cutter means 42 is moved through the rock 41, the vise means 40 will now be described in detail. Referring to FIG. 5 in particular, the vise means 40 includes four vise legs 100 which are essentially threaded shafts which extend down through the frame cross member 101, and are held there by means of nuts 102. These legs 100 extend up through a fluid collecting pan 102a, which pan is also held to said legs by additional nuts 102.

A vise frame 103 is located at the upper ends of the vise legs 100. The vise frame 103 comprises slide rails 104 which extend between end members 105, said end members 105 being secured to said slide rails 104 by means such as welding. Then, through the use of nuts 106, the vise frame 103 may be moved upward or downward as desired.

On said vise frame 103, there is located a vise bed 108. The vise bed 108 is slidably secured to said slide rails 104 through the use of guides 109 secured to the underside of the vise bed. In order to move the vise bed 108 to the right and to the left, there is provided a lead screw 110 which is rotatably secured between said end members 105. In FIG. 2, the vise bed 108 has been broken away in order to show how the lead screw 110 is held (by way of example by nut 112 at its left end (as seen in FIG. 2)) and by an enlargement 111 at the right end of the lead screw. The lead screw 110 extends through a threaded boss 113 on the underside of the bed 108. And, accordingly, the bed 108 may be moved to the left and to the right by turning a hand wheel 114 on the lead screw. The lead screw is provided with threads having a 1/16 inch lead. Therefore, the vise bed 108 is moved 1/16 of an inch in either direction each time the hand wheel 114 is turned 360°.

Of particular importance is to note the manner in which the vise means 40 is able to accommodate a wide range of sizes and shapes of rocks or other irregular material to be cut.

With particular reference to FIG. 4, the vise bed 108 has a plurality of slots 116 in the upper surface thereof. As shown best in FIG. 4, each of the slots 116 is undercut on either side as at 117. The manner in which these undercuts 117 are used will be described below.

At the front edge of the vise bed 108 there is an upstanding abutment wall 118. Secured to said abutment wall 118, there is a wedge guide block 120 having a plurality of vertical channels therein for a purpose to be described. On the front side of said abutment wall 118 there are a pair of brackets 122 between which extends a very rigid axle, or rod, 123 which is rigidly secured to said brackets. Slidably located on said axle 123, are a plurality of cam members 124 (see FIG. 3 in detail). These cam members may be slid longitudinally along the axle 123. Also, these cam members may be freely rotated around the axle 123.

As best seen in FIG. 3, each cam member 124 has a cam surface 125 which gradually increases its distance from the center of rotation of the cam member as the cam surface extends clockwise (as seen in FIG. 3) toward a finger 126 located on the cam member. It can also be seen that there is provided a stub arm 127 on the cam member 124. This stub arm 127 is specifically adapted to receive thereover a short pipe, or a handle, which is used to apply great torque to the cam member 124 in a clockwise direction (as seen in FIG. 3).

Referring back to FIG. 4, it can be seen that there is provided a sliding cross foot 129 having an eye 130 thereon connected to one end of each locking chain 131. This locking chain 131 is extended around the rock 41, and any particular selected link of the locking chain 131 is then engaged around the finger 126.

In order to prevent the cam member 124 from rotating counterclockwise, there is provided a shim, or wedge, 132 received in the channel 121 on the wedge guide block 120 immediately opposite the cam member 124. This shim, or wedge, 132 is provided with a shallow groove, or channel, 133 in order to hold the cam member 124 from moving axially along the axle 125 during operation.

By way of example, the vise means 40 is used to the following manner. Firstly, a selected rock 41 is placed on the vise bed 108. Then, the cross foot 129 of two locking chains 131 are placed in any one of the desired slots 116. At that time, the operator will stretch the locking chains 131 over the rock 41 in several positions in order to find the position where the chains get the best purchase on the rock. The operator is able to do this because of the large number of channels 121 provided in the wedge guide block 120. In FIG. 2, the locking chains 131 are shown extending substantially at a right angle to the upstanding abutment wall 118. Therefore, there is not much side loading of the cam members 124. However, it will be noted that the wedge and cam member combination, to wit, wedge 132 and cam member 124, can accommodate such side loading. This is because each cam member 124 is received in the shallow groove, or channel, 133 of the shim, or wedge, 132. And, the wedge 132 is received in a channel 121.

The final tightening of each locking chain 131 is accomplished in substantially the same manner. More particularly, the removable handle 128 is placed around the stub arm 127, and the cam member 124 is rotated slightly counterclockwise (as seen in FIG. 3). Then, the particular desired link of the locking chain 131 is placed around the finger 126 on the cam member 124. At this point, a wedge 132 is placed in the position shown. Then, by merely pulling or pushing downward on the handle 128, the locking chain 131 is tightened by the resultant clockwise movement (as seen in FIG. 3) of the cam member 124. The wedge 132 is of such shape that it will prevent the cam member 124 from returning in the counterclockwise direction. Said wedge 132 eliminates any such counterclockwise rotation unitl it is desired to remove the particular locking chain 131.

When it is desired to remove the particular locking chain 131, the handle 128 is replaced around the stub arm 127, and a clockwise (as seen in FIG. 3) rotational torque is applied to the cam member 124. Although hardly any motion of the cam member 124 can be accomplished in this manner, there is sufficient motion that the wedge 132 can be released enough to be lifted by the operator's fingers. Then, the cam member 124 may be easily rotated counterclockwise (as seen in FIG. 3) as much as desired.

While only a few embodiments of the present invention have been shown and described, it will be apparent to those skilled in the art that such is by way of illustration only.

I claim:

1. An improved saw apparatus including:
 a frame;
 vise means on said frame for holding the article to be cut;
 cutter means for cutting an article held by said vise means, said cutter means including a saw blade mounted on said frame for cutting movement;
 travel means for moving said saw blade and said vise means relative to each other from a first position to a second position along a generally horizontal path during which movement the saw blade will pass through a part of an article held by said vise means, said travel means includes:
 a track connected to said frame and extending parallel to said path;
 a carriage mounted on said track for free motion along said path;
 and means mounting one of said cutter means and said vise means on said carriage;
 and cutting force means connected to said frame for causing a selected constant force to urge said saw blade and said vise means between first and second positions relative to each other, said cutting force means including means for selectively tilting said track relative to horizontal to select the amount of force of gravity to urge said carriage from said first position towards said second position relative to said vise means.

2. The apparatus set forth in claim 1 including:
 a base;
 support structure connected to said base and said frame tiltingly supporting said frame;
 and separate means for selectively locking said frame in any selected tilt orientation relative to said base.

3. The apparatus set forth in claim 1 including:
 means for selectively locking said cutter means in said first position.

4. The apparatus set forth in claim 1 including:
 a motor connected to said saw blade for rotating the same;
 and means on said saw for automatically switching off said motor when said saw blade reaches said second position.

5. The apparatus set forth in claim 1 wherein: said track comprises two rails each of which has a square cross section with four faces with an edge corner of the square being uppermost, and said carriage rides on said rails on wheels which ride on the upper two faces of the rails.

6. The saw apparatus set forth in claim 1 wherein said frame has a left hand section and a right hand section each of which is independently tiltable about the same horizontal axis, said cutter means is located on one of said left and right hand frame sections and said vise means is mounted on the other of said left and right hand frame sections, and including:
means for selectively joining said left and right hand frame sections together so they can only tilt together;
and means connected to each of said left and right hand frame sections for independently securing each frame section in any tilted position, whereby said left and right hand frame sections may be moved together or independently of each other.

7. In apparatus having cutting means for cutting an article, vise means for holding an article to be cut, said vise means including:
a vise bed mounted on said frame;
an abutment wall on one edge thereof;
flexible chain means for holding against said vise bed and said abutment wall the article to be cut, said flexible chain means including:
means thereon for securing said chain means to said vise bed in any one of a large number of positions;
tightening means connected to said chain means for drawing said chain means tight, said tightening means operatively connected to the vise means to permit the tightening means to be placed at any of a number of positions along said one edge so as to permit the chain means to be extended over the article to be cut at any desired relation and thereby grip more securely the article to be cut.

8. In apparatus having cutting means for cutting an article, vise means for holding an article to be cut, said vise means including:
a vise bed;
an abutment wall extending along one edge of said vise;
an upwardly facing vise bed on which to receive the article to be cut;
a plurality of locking chains selectively secured to secure the article to be cut;
means on one end of each locking chain and along a line of said vise bed which is at substantially a right angle to said abutment wall for securing one end of said locking chain to said bed anywhere along said line;
and tightening means connected to said vise means and said locking chain for tightening said locking chains, and tightening means being located on said vise means adjacent said abutment wall and being turnable to pull any article within the locking chains toward said abutment wall.

9. The saw apparatus set forth in claim 8 wherein said tightening means includes:
a plurality of locking cams, each of said cams having a finger adapted to engage a link on a locking chain, said locking cam being rotatably mounted for movement between a first position where said finger is one distance from said vise bed and a second position where said finger is further away from said vise bed causing a locking chain connected thereto to be tightened thereto;
locking means operatively connected to each locking cam for selectively preventing said locking cam from moving from said second position toward said first position.

10. The apparatus set forth in claim 9 wherein said locking means for each locking cam includes:
a wedge located between said locking cam and said abutment wall;
said locking cam having a cam surface which moves closer to said abutment wall as the cam is moved from said second position toward said first position.

11. The apparatus set forth in claim 10 including:
a horizontal rod extending parallel to said abutment wall, said rod having rotatably and slidably mounted thereon said locking cams;
and means operatively connected to said cams and said vise bed for selectively securing said locking cams against said sliding movement whereby said locking cams may exert force against the article to be cut in directions other than at a right angle to said abutment wall.

12. The apparatus set forth in claim 10 wherein:
said locking cams are adjacent a face of said abutment wall which face is away from the vise bed;
said locking cams each having a cam surface which moves closer to said adjacent abutment wall face as the cam is moved from said second position toward said first position;
said locking means for each locking cam includes a wedge located between said locking cam and said adjacent abutment wall face;
and means for securing said cams against sliding movement, said last mentioned means including:
a slot on one of said wedge and said adjacent abutment wall face receiving therein a projecting portion of the other of said wedge and said adjacent abutment wall face;
and a slot on one of said wedge and said locking cam surface receiving therein a projecting portion of the other of said wedge and cam surface.

13. An improved saw apparatus including:
vise means on said apparatus for holding an article to be cut;
cutter means for cutting an article held by said vise means, said cutter means including a saw blade mounted on said apparatus for cutting movement;
travel means for moving said saw blade and said vise means from a first position to a second position relative to each other along a generally horizontal path during which movement the saw blade may pass through a part of an article held by said vise means;
and cutting force means connected to said cutter means and vise means for causing a selected constant force to urge said saw blade and said vise means between said first and second positions relative to each other, said selected constant force being a function of the angle of said path to horizontal, said cutting force means including means for selectively tilting said path relative to horizontal and thereby select the selected constant force.

14. An improved saw apparatus including:

vise means on said apparatus for holding an article to be cut, said vise means having a support surface on which may be received an article to be cut;

cutter means on said apparatus for cutting an article held by said vise means, said cutter means including a circular blade carried on a rotatable shaft for rotation in a predetermined plane at a right angle to shaft;

travel means on said apparatus for moving said saw blade and said vise means from a first location to a second location relative to each other along a predetermined path at a right angle to said shaft during which movement said saw blade may pass through a part of an article held by said vise means;

and means on said apparatus for moving said saw blade and said vise means relative to each other with a resultant displacement at a right angle to said shaft and said predetermined path from a first position where said rotatable shaft is located on one side of said support surface and a second position where said rotatable shaft is located on a second opposite side of said support surface while said support surface remains fixed in space relative to the apparatus, said last mentioned means comprising:

a support having a first and a second point spaced apart a substantial distance which is slightly less than the radius of said saw blade, said support carrying for rotation said rotatable shaft at said first point;

and swingable connection means connecting said support and said apparatus at said second point for swinging said support about an axis through said second point parallel to said rotable shaft from a first orientation with said rotatable shaft located on one side of said support surface to a second orientation approximately 180° from said first orientation whereby said rotatable shaft is located on said second opposite side of said support surface.

15. The invention set forth in claim 14 including: power means for rotating said rotatable shaft and said saw blade, said power means including: a driving shaft expending through said support at said second point parallel to said rotatable shaft;

and power transmission means for transmitting rotation of said driving shaft to said rotatable shaft;

and said support swings about said driving shaft.

16. The apparatus set forth in claim 14 wherein said vise means remains stationary while said saw blade is moved between said first and second position.

17. The apparatus set forth in claim 16 wherein said saw blade is rotatable in the same plane when it is in the first position and when it is in the second position.

* * * * *